US008396808B2

(12) United States Patent
Greenspan

(10) Patent No.: US 8,396,808 B2
(45) Date of Patent: Mar. 12, 2013

(54) METHOD AND SYSTEM FOR TRANSFERRING AN ELECTRONIC PAYMENT

(75) Inventor: Aaron J. Greenspan, Palo Alto, CA (US)

(73) Assignee: Think Computer Corporation, Palo Alto, CA (US)

( * ) Notice: Subject to any disclaimer, the term of this patent is extended or adjusted under 35 U.S.C. 154(b) by 150 days.

(21) Appl. No.: 12/641,071

(22) Filed: Dec. 17, 2009

(65) Prior Publication Data

US 2011/0029416 A1    Feb. 3, 2011

Related U.S. Application Data

(60) Provisional application No. 61/230,387, filed on Jul. 31, 2009.

(51) Int. Cl.
*G06Q 20/00* (2012.01)

(52) U.S. Cl. ............... 705/64; 705/65; 705/67; 705/72; 705/79

(58) Field of Classification Search .............. 705/64, 705/65, 67, 72, 75, 78, 79
See application file for complete search history.

(56) References Cited

U.S. PATENT DOCUMENTS

| 6,260,024 | B1 | 7/2001 | Shkedy | |
|---|---|---|---|---|
| 7,127,606 | B2 * | 10/2006 | Wheeler et al. | 713/156 |
| 7,873,573 | B2 * | 1/2011 | Realini | 705/39 |
| 2003/0061170 | A1 | 3/2003 | Uzo | |
| 2004/0167820 | A1 * | 8/2004 | Melick et al. | 705/16 |
| 2004/0254861 | A1 | 12/2004 | Pentel | |
| 2005/0043996 | A1 * | 2/2005 | Silver | 705/15 |
| 2006/0099964 | A1 * | 5/2006 | Barrese et al. | 455/456.3 |
| 2007/0055597 | A1 * | 3/2007 | Patel et al. | 705/35 |
| 2008/0120155 | A1 * | 5/2008 | Pliha | 705/7 |
| 2009/0099961 | A1 | 4/2009 | Ogilvy | |
| 2010/0125495 | A1 * | 5/2010 | Smith et al. | 705/14.23 |
| 2010/0138344 | A1 * | 6/2010 | Wong et al. | 705/44 |
| 2010/0219234 | A1 * | 9/2010 | Forbes | 235/375 |
| 2010/0318219 | A1 * | 12/2010 | Kuehnrich et al. | 700/232 |

OTHER PUBLICATIONS

Definition of "separate" as "detached, disconnected, or disjoined". Retrieved from Random House Dictionary, Random House, Inc. (2011).*
Zhang, J. (2006). The roles of players and reputation: Evidence from eBay online auctions. Decision Support Systems 42, 1800-1818 (hereinafter "eBay").*

* cited by examiner

*Primary Examiner* — Elaine Gort
*Assistant Examiner* — Peter Ludwig
(74) *Attorney, Agent, or Firm* — Jeffrey Schox; Derek Westberg

(57) ABSTRACT

A method and system for transferring an electronic payment between a purchaser and a merchant that includes assigning a role of a merchant account to a first account and a role of a purchaser account to a second account within a payment system, adding an item from a product catalog stored in the payment system to a purchase list, obtaining a user ID token of a purchaser from a merchant terminal, communicating identity confirmation information associated with the user ID token to the merchant terminal, and transferring funds for the purchase price total from the purchaser account to the merchant account.

22 Claims, 9 Drawing Sheets

METHOD AND SYSTEM FOR TRANSFERRING AN ELECTRONIC PAYMENT

CROSS-REFERENCE TO RELATED APPLICATIONS

This application claims the benefit of U.S. Provisional Application No. 61/230,387, filed 31 Jul. 2009, entitled "Method and System for Uniquely Identifying Purchasers of Specific Goods and Services and Associated Transaction Details" which is incorporated in its entirety by this reference.

TECHNICAL FIELD

This invention relates generally to the payment transaction field, and more specifically to a new and useful method and system for transferring an electronic payment in the payment transaction field.

BACKGROUND

Electronic payment transactions occur daily and have become ubiquitous in everyday life. The transactions and related execution costs, however, are becoming more burdensome for businesses and are adversely affecting the bottom line of businesses. This problem is especially acute for small businesses that rely on relatively thin profit margins.

Credit card companies have gained a foothold as the most widely accepted non-cash form of payment for transactions, and many consumers exclusively transact only with merchants that accept credit cards. Thus, many businesses are compelled to use the services of credit card companies despite the costly overhead associated with credit card transactions. Merchants have the additional burden of handling the secure information of a credit card, which exposes the business to legal liability. Despite the high cost of credit card transactions, the technology employed for credit cards is able to provide limited security at the time of sale and limited reporting information for a purchase. Thus, there is a need in the payment transaction field to create a new and useful method and system for transferring an electronic payment. This invention provides such a new and useful method and system.

SUMMARY

The method for transferring an electronic payment of the preferred embodiment includes assigning a role of a merchant account to a first account and a role of a purchaser account to a second account within a payment system for the given transaction, adding an item from a product catalog to a purchase list, transmitting one or more user identification (ID) tokens belonging to the purchaser from a terminal to the payment system, communicating identity confirmation information associated with the user ID from the payment system back to the terminal, allowing the purchaser to perform intermediate steps related to purchase tracking and marketing incentives, and transferring funds for the transaction from the purchaser's account to the merchant's account. The method functions to allow two parties, such as a merchant and a purchaser, to complete a transaction through an electronic terminal. More preferably, the method functions to allow for an electronic payment at a point of sale. The electronic terminal may be a personal computer, a mobile phone, or any suitable internet-enabled device. In one embodiment, the merchant uses a merchant terminal, but in alternative embodiments a merchant terminal and a purchaser terminal may be used for carrying out steps of the preferred method. The merchant terminal and/or purchaser terminal preferably use an account portal to communicate with the payment system. An account portal is preferably a software application or a web-based software application that provides an interface on an electronic terminal for user interaction with the payment system. The method is preferably performed over an internet network that is used for communication between the payment system and the merchant terminal and/or purchaser terminal. The internet network is preferably a secure, TCP/IP-based network, but may be any suitable network. The product catalog of the merchant is preferably created by a merchant with an account on the payment system, and is preferably hosted by the payment system. The integration of the payment system and product catalog functions to enable recording and tracking transactions with itemized detail. The itemized detail is preferably available to both the merchant and the purchaser in real-time, which enables various forms of purchase augmentation, notification, and accounting on a per item basis. Most preferably the merchant and purchaser can access the payment system through an internet website on a desktop or laptop computer or a mobile device.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Method for Transferring an Electronic Payment

Figure 1:
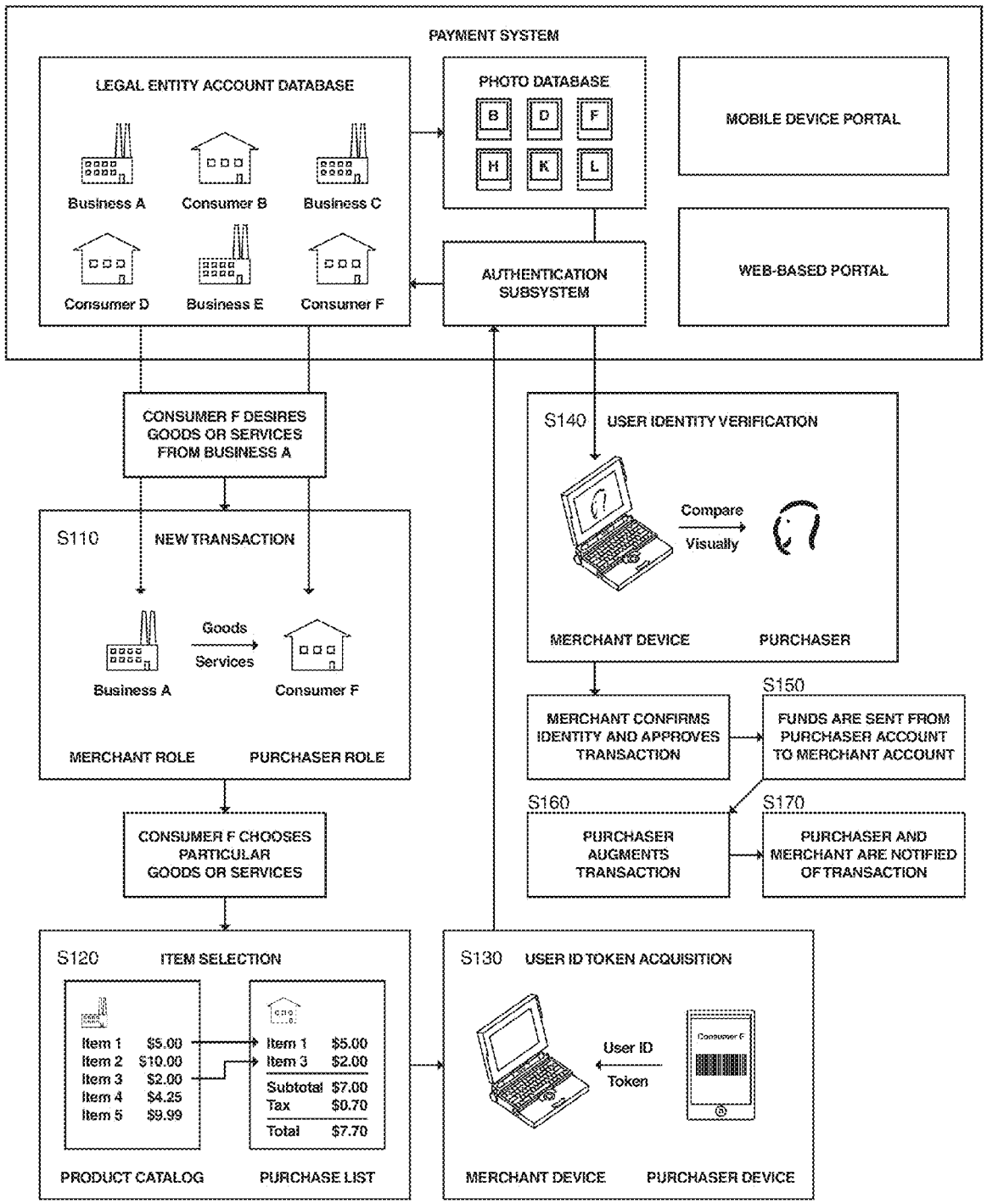
FIG. 1 is a flowchart representation of a method for transferring an electronic payment of a preferred embodiment of the invention.

As mentioned above and as shown in FIG. 1, the method for transferring an electronic payment of the preferred embodiment includes assigning a role of a merchant account to a first account and a role of a purchaser account to a second account within a payment system S110, adding an item from a product catalog to a purchase list S120, obtaining a user identification (ID) of a purchaser from a merchant terminal S130, communicating identity confirmation information associated with the user ID from the payment system to the merchant terminal S140, and transferring funds for the purchase to the merchant account S150.

Figure 2:
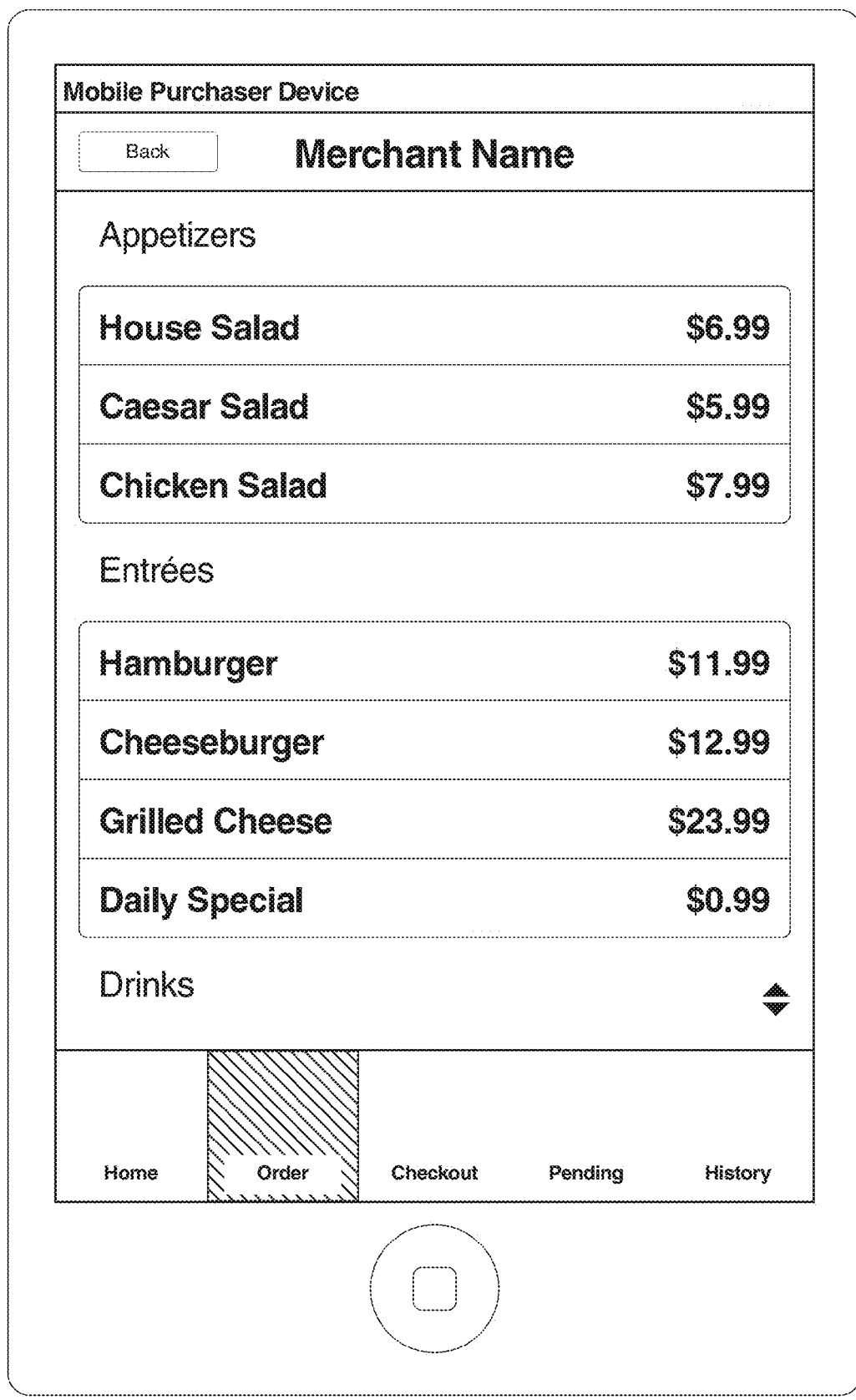
FIG. 2 is an exemplary screenshot of an electronic terminal displaying a portion of a product catalog of a merchant.

Step S110, which includes assigning a role of a merchant account to a first account and a role of a purchaser account to a second account within a payment system, functions to register a purchaser and a merchant for a transaction within a single integrated system. The payment system preferably allows for transfer of information and data through various stages of the purchase process. The payment system preferably creates a standard protocol, interface, and user experience that enables enhancements to the payment process as described below. The payment system is preferably used for communicating to a merchant terminal and for completing payment transaction. An entity (e.g., a person, business, or other legally recognized entity) preferably creates an account within the payment system. The accounts of the payment system are preferably designed so that an account may selectively function as either a merchant or a purchaser during any particular transaction. In other words, within the scope of all transactions, accounts of the payment system can function as bi-directional transaction accounts. The merchant is preferably the entity providing goods and/or services to the purchaser and typically receiving payment for the goods or services. In many situations the merchant account is a business but may alternatively be a person receiving payment from another person or a business. For a transaction, the merchant account role and the purchaser account role are preferably assigned to at least one account each. Among other benefits, the versatility of an entity account in the payment system enables simplified bookkeeping (e.g., elimination of duplicate database records). As part of the step of assigning a purchaser account and a merchant account, the payment system may additionally host an account portal that functions to support the interaction between the payment system and the merchant and purchaser, respectively. Through the account portal a user can preferably access account information, view and update a product catalog, access financial tools, carry out a transaction as merchant or a purchaser, and/or perform any suitable task within the payment system. The account portal is preferably a website but may alternatively use any suitable implementation to facilitate the use of the payment system, such as an Application Programming Interface (API) accessed by other parties. The payment system may additionally aid in the process of tracking transaction history, automatically completing tax forms based upon data from itemized history of an entity, performing general ledger accounting, tracking purchase or sales trends, performing budgeting tasks, and any performing any suitable service. Additionally, the payment system may aid in managing a social network of a plurality of entities. The social network is preferably based on the entity accounts and transactions that occur between various accounts of the payment system. Creating an entity account may include linking a financial account (e.g., credit card or bank account) with the system. Additionally or alternatively, the payment system may include the creation of a payment system account enabling the deposit and withdrawal of money into and out of a financial account (e.g. a traditional checking or savings account at a bank). As preparation of being assigned the role of a merchant account, creating an account (i.e., an entity account) may include the sub-step of creating a product catalog of the merchant. The product catalog preferably includes the products offered for sale by a merchant. A product may include any physical product, abstract product (e.g., insurance contract or home mortgage), a service, or any suitable salable item. The product catalog is preferably associated with a particular entity, but may alternatively be shared by a plurality of entities (such as a corporate chain with shared product offering, or in cases where many discrete entities sell the same generic product). The product catalog preferably includes a listing of product descriptions and prices for each product contained within the product catalog. Additional information may be included for a product such as categories for tax purposes and other purposes, product-related IDs for each distributor of the product (e.g., Stock-Keeping Unit or "SKU"), images or media files related to the product, inventory related information (the number of items on hand, on order, etc. at each warehouse location), or any other suitable product-related data. The product catalog may be a database accessed by outside applications, but may additionally or alternatively include a hosted web-based store through which products can be added to a shopping cart (i.e., a purchase list). The product catalog is preferably served (sent via the internet) to a terminal (either of a merchant or a purchaser during a transaction), as shown in FIG. 2. The product catalog may additionally include any suitable option used by a merchant in the pricing and sale of a product. For example, the product catalog may include options for implementing sales, promotional offerings, customizations (including customizing a first product with add-on products, or "up-selling"), allowing for hierarchical ordering of products, and allowing for any suitable pricing mechanism of a merchant (including quantity-based pricing or subscription based products with recurring charges).

Figure 3:
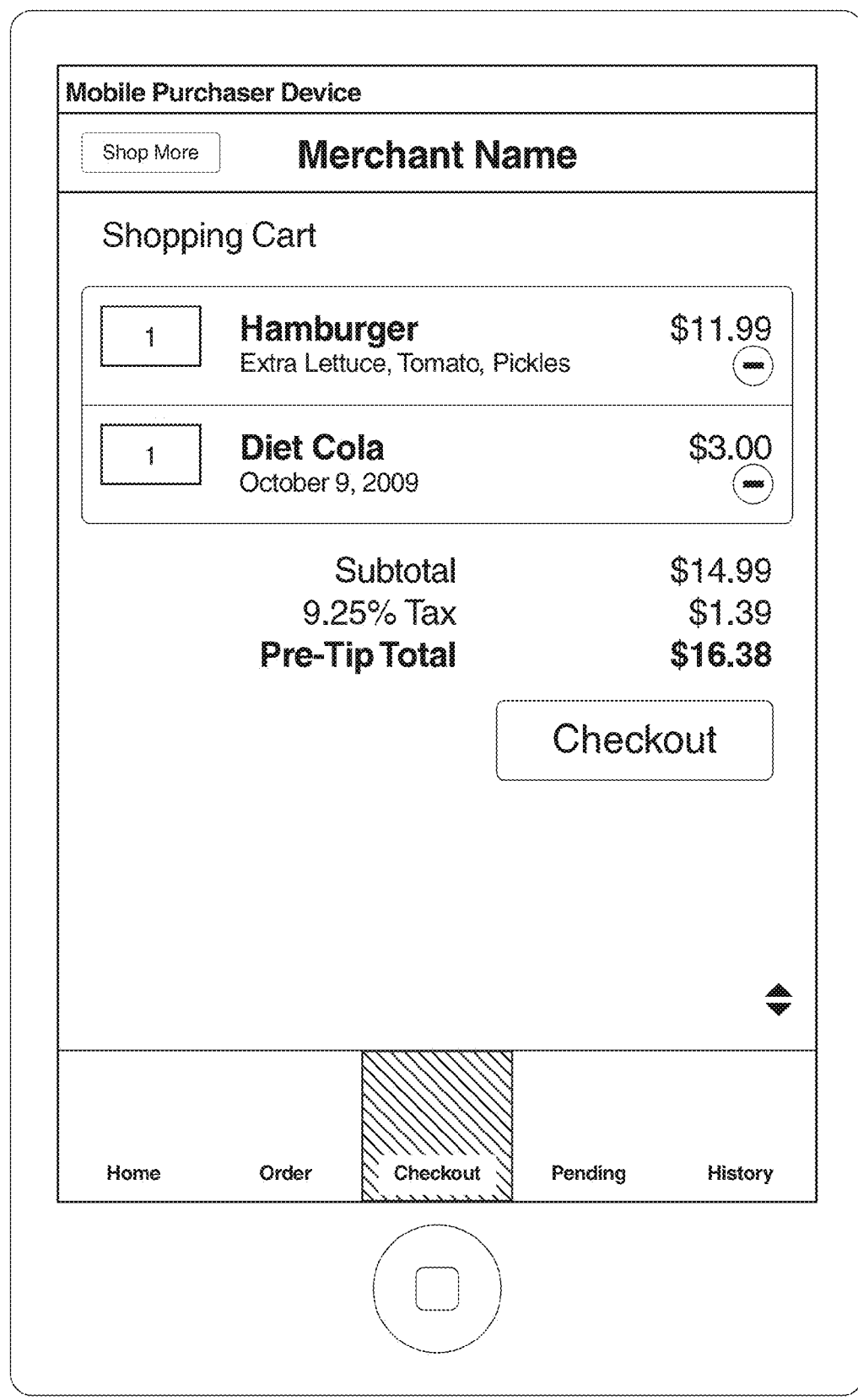
FIG. 3 is an exemplary screenshot of an electronic terminal displaying a purchase list.

Step S120, which includes adding an item from a product catalog to a purchase list, functions to form a list of all products of a purchase made by a purchaser and to calculate the purchase price total, as shown in FIG. 3. The product catalog is preferably accessed by a representative of the merchant on a terminal, and the representative is preferably responsible for adding those items that a purchaser plans to purchase. The purchaser may alternatively or additionally add items to the purchase list in an embodiment where the product catalog is made accessible to a purchaser terminal. A product catalog of a merchant may be accessed by navigating to a unique address or, alternatively, by navigating to a product catalog based on purchaser terminal location. The step of navigating to a product catalog based on purchaser terminal location preferably includes obtaining the location of the purchaser terminal (such as by GPS, internet location techniques, telephone tower triangulation, etc.) and providing a product catalog of a merchant that is near the location of the purchaser terminal. In this situation, "near the location of the purchaser terminal" may be determined by absolute distance or relative distance compared to other merchants with product catalogs. The purchase list created on a purchaser terminal is preferably sent to the appropriate merchant terminal when the purchaser is ready to complete a purchase. In the variation of a purchaser-created purchase list, a merchant preferably performs step S130 to establish a link between a purchaser and a merchant, and then the purchase list is sent to the merchant. The purchaser list from a purchaser terminal may additionally be merged with a purchase list from a merchant terminal.

Step S130, which includes obtaining user identification (ID) tokens of a purchaser from a merchant terminal, functions to gather at least one unique identifier of the purchaser. The user ID may be implemented in various forms. Preferably, the user ID is a barcode that encodes a user identification value (e.g., a alphanumeric code). More preferably, the barcode is a Code 128-C barcode corresponding to a user ID stored in an internet-accessible database table uniquely representing an entity account (i.e., the specific individual) used in making the purchase. The barcode is preferably collected from a terminal through a barcode scanner, a camera, or any suitable imaging device. The barcode may be read from a printed card, but may alternatively be displayed on a screen of a mobile device utilizing LCD, LED, OLED, e-Ink, or any suitable display technology. Alternatively, the user ID may be entered manually, read from a magnetic strip, read from an RFID tag, biometrically scanned, obtained from visual recognition, or entered in any other manner suitable for reading an encoded ID. The user identification value may additionally be used for situations where a barcode cannot be used. The user identification value is preferably an 11-digit value, but any suitable length of code may be used such as any standard code length used in a particular technology (Code 128-C barcode). The user ID is preferably sent over an internet connection to the payment system. Upon receiving the user ID the payment system can establish a transaction session between the merchant account logged into on the merchant terminal and the purchaser account identified from the user ID.

Step S140, which includes communicating identity confirmation information associated with the user ID from the payment system to the merchant terminal, functions to provide the merchant with a way to verify the identity of the purchaser. Preferably, Step S140 includes sending an image associated with the account ID. The image is preferably a photograph of the owner of the purchaser account, which a merchant can use as reference to verify that the purchaser (the person who is attempting to make the purchase and who is likely within visual range of the representative of the merchant) visually matches the person in the photograph associated with the account. Alternatively or in addition, any suitable form of verification may be used such as a security question and answer, a PIN number or password, address information, biometric signatures compared to biometric readings, and/or any other suitable information for identity confirmation. The payment system preferably receives a communication indicating purchase approval or purchase denial from the merchant terminal. The purchase is preferably denied by the representative of the merchant if the confirmation information is not approved.

Step S150, which includes transferring funds for the purchase price total to an account of the merchant, functions to finalize the purchase. Step S150 is preferably performed after receiving purchase approval from the merchant terminal. The amount of funds transferred to the merchant account preferably covers the purchase price total, which includes the sum total of the price of products in the purchase list, tax, and any additional costs such as gratuity. The payment system preferably performs the necessary tasks for transferring funds such as verifying that enough funds are in an account prior to making the transaction to avoid any penalty fees. Additionally, after completing a purchase, the method may additionally store purchase list information as a transaction record for the merchant account and/or the purchaser account, which functions to form an itemized purchase history. A purchaser or merchant can preferably access transaction records stored on a respective payment system account, and all data from a purchase list is preferably accessible. The itemized transaction records can be used for detailed analysis of purchase trends, account budgeting, or any suitable application.

Additionally or alternatively, the method of the preferred embodiment includes augmenting a transaction S160, which functions to provide a purchaser with control over purchasing options. The transaction is preferably the transaction associated with the transfer of funds of the purchase price total from the purchaser account to the merchant account. A purchaser or a merchant preferably provides input prior, during, or after the transfer of funds and that input results in some action using transaction based information. Additionally or alternatively, during the process of augmenting of a transaction, account-related and/or transaction-related information may be communicated to the purchaser and/or merchant through a terminal. A transaction may be augmented through several variations including adding a purchaser-variable value to the purchase price total S162, charging a portion of the purchase price total to at least a second account S164, applying a budgeting rule that transfers money based in part on the purchase S166, and/or any other suitable manner of augmenting the financial effects of a purchase.

Figure 4:
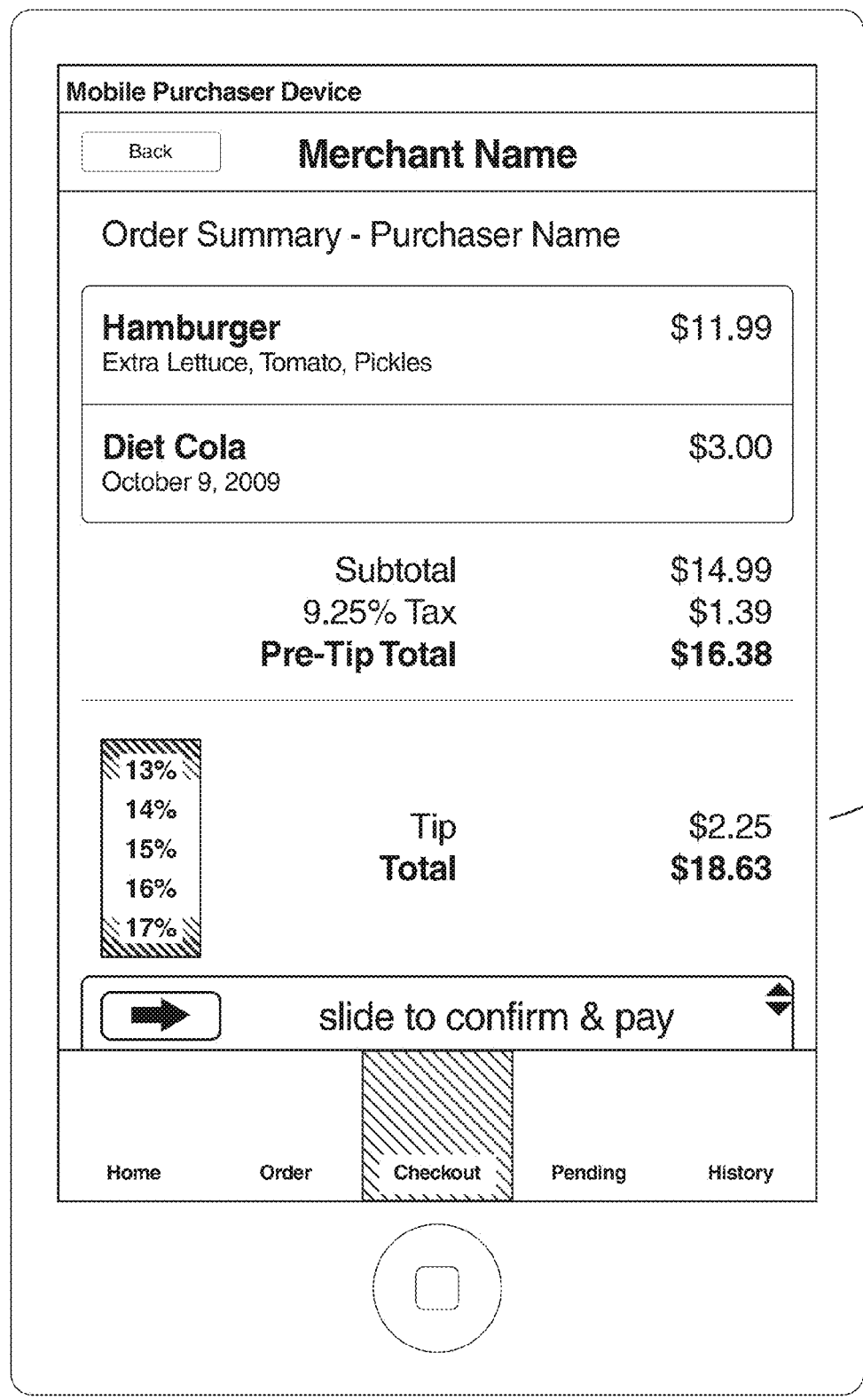
FIG. 4 is an exemplary screenshot of an electronic terminal displaying an interface for adding a purchaser-variable value to the purchase price total.

Step S162, which includes adding a purchaser-variable value to the purchase price total as shown in FIG. 4, functions to allow the common practice of adding a customer tip to a purchase. This has particular applications for purchases made at restaurants that require (or at least expect) tips, but may have wider applications such as for charities and fundraisers where a person donating money would want to specify the amount to pay. A purchaser-variable value item (or tip field) is preferably added to a purchase list. This may be added by the merchant or automatically added based on the classification of the merchant or by any suitable means. For example, a merchant with a Standard Industry Classification (SIC) of 58 corresponding to an "Eating and Drinking Place" would preferably have a tip field automatically added to purchases. Additionally, the specific location of the merchant may determine if a tip field should be added, such as in the situation where some locations of a particular merchant use tip and others do not. When a tip field is added to a purchase list, the purchaser preferably is provided with an interface on a purchaser terminal for entering a desired value to add to the purchase price total. As shown in FIG. 4, the interface may additionally suggest common tip amounts such as 10%, 15%, and 20% values of the purchase price pre-tax. The interface is preferably provided through the account portal on a purchaser terminal, but may additionally be provided through the account portal on the merchant terminal. Additionally, the tip field may be completed by a purchaser at a time after the initial payment of the purchase price total. The tip field preferably has an expiration time and a default tip value, so that if the purchaser forgets to enter a value within a set amount of time (e.g., 24 hours), a default tip will be added to the purchase price total. The default tip may be set at zero or set at a greater than zero amount.

Figure 5:
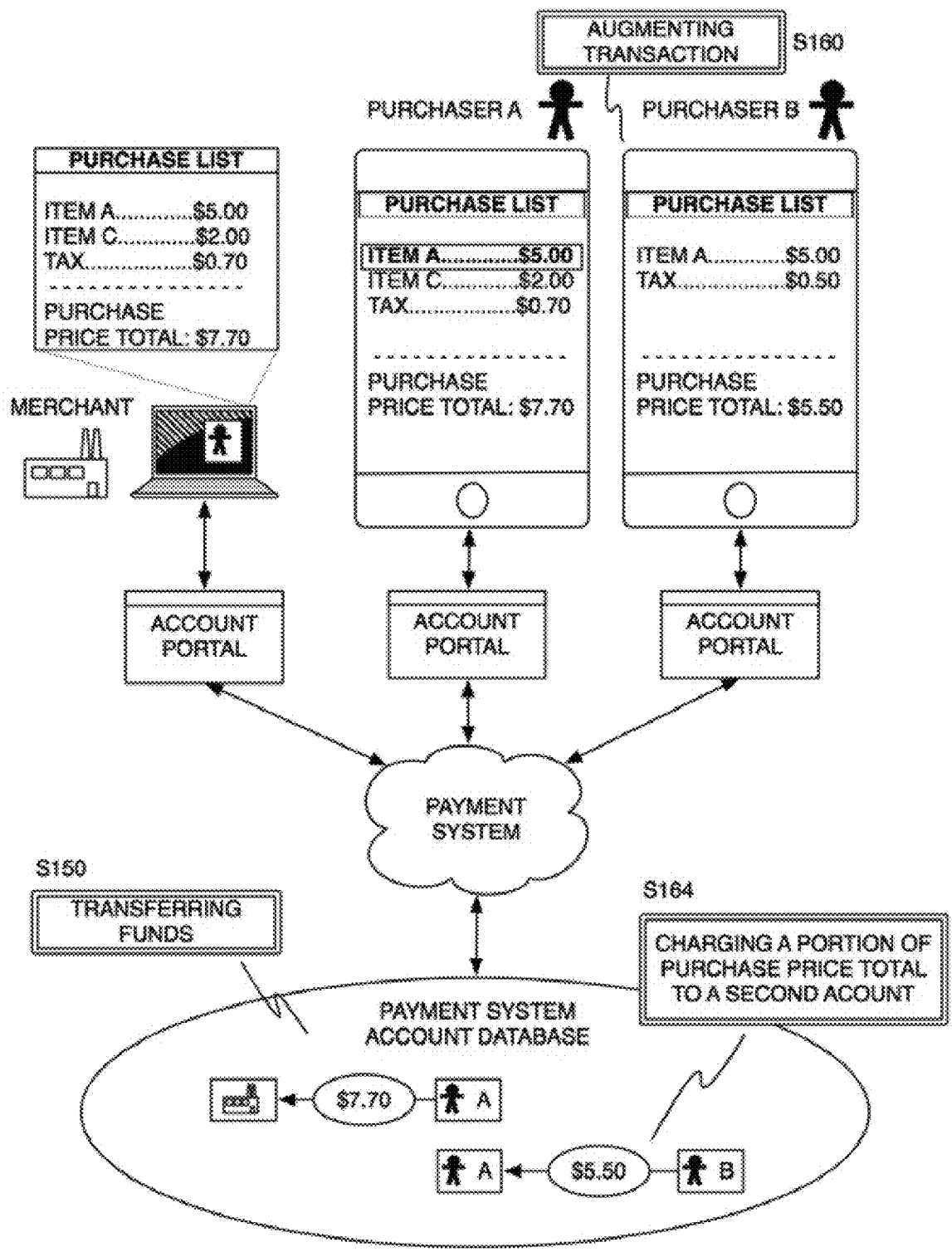
FIG. 5 is an exemplary flowchart representation of charging a portion of a purchase price total to a second account.
Figure 6:
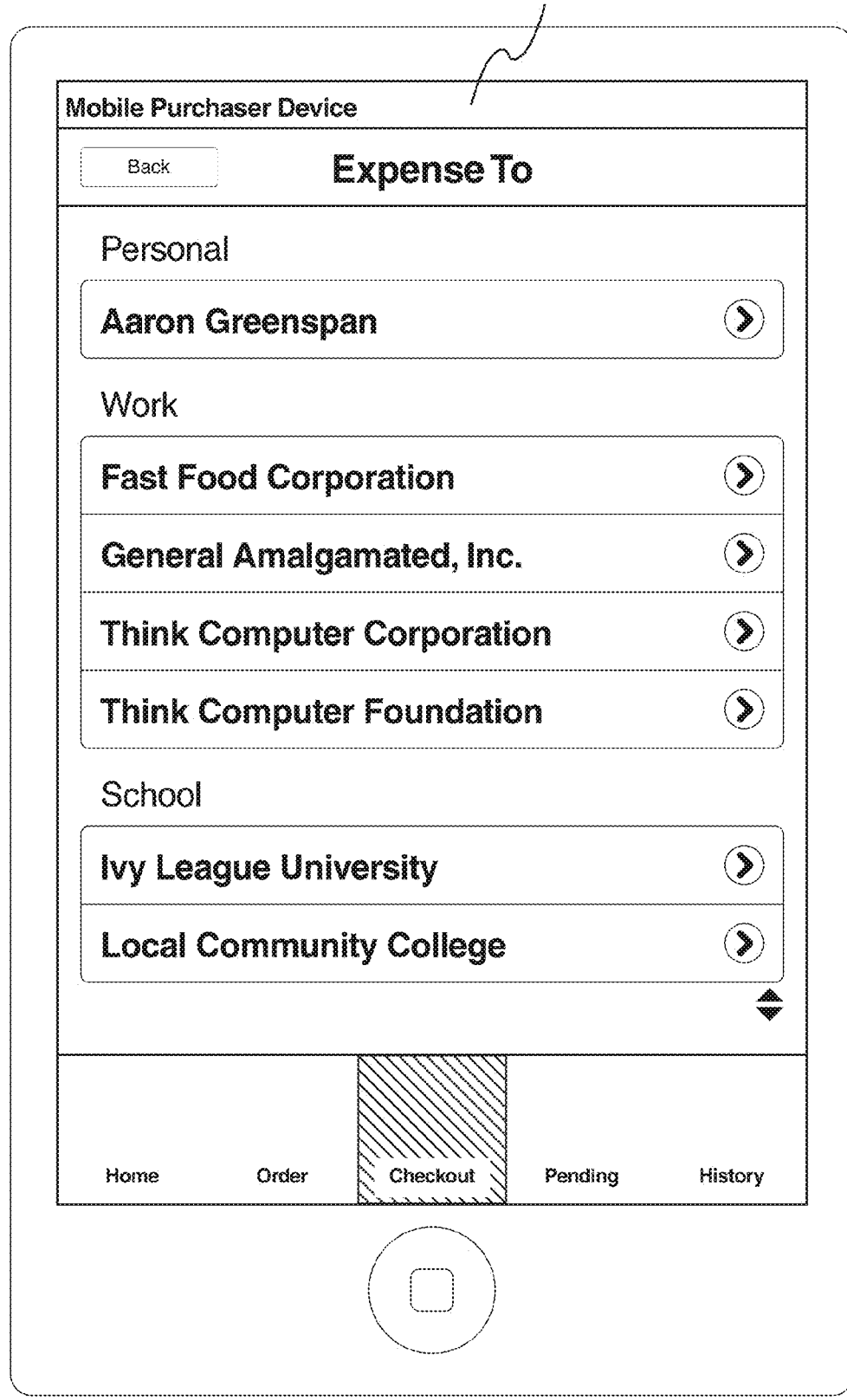
FIG. 6 is an exemplary screenshot of an electronic terminal displaying an interface for assigning a transaction to a legal entity associated with the present purchaser using the payment system.

Step S164, charging a portion of the purchase price total to at least a second account as shown in FIGS. 5 and 6, which functions to split the bill between multiple parties. This step may be useful when multiple people wish to split the cost of a purchase, such as group at a restaurant or a bar. Preferably, a first purchaser (primary purchaser) accepts the charges for the purchase from the merchant. Then the purchaser preferably distributes the cost of the purchase to at least a second purchaser and may additionally distribute the cost to any suitable number of purchasers. The primary purchaser may charge the second purchaser in a fashion substantially similar to the way a merchant completes a transaction with a purchaser (Steps S130, S140, and S150). As the identity of the second purchaser is preferably trusted by the first purchaser, the identity verification step may be omitted or disregarded. The second purchaser may additionally need to accept charges. In a first variation, the purchase price total is preferably split based on a percentage of the purchase price total. For example, the purchaser may charge a second person for 50% of the bill so that the two people evenly pay for the purchase. As a second variation shown in FIG. 5, a purchase may be divided on a per item basis. Items that a second person should pay for are selected by a purchaser through an interface, and then the second purchaser is charged the sum total of the selected items (transferring funds from the second purchaser to the original purchaser). Additional purchase charges, such as tax and tip, are preferably divided so that each purchaser pays an appropriate amount resulting from the marked items is additionally charged to the other person. Additionally, a percentage of the cost of an individual item may be charged to the other person. The purchase price total may alternatively be divided in any suitable fashion. This step may additionally be applied to spread costs between various accounts of a single purchaser, as shown in FIG. 6. As one example, a purchaser may have a corporate account for business purchases and a personal account for personal purchases. Through the step of S164, a purchaser would be able to easily distribute the cost of a purchase as the purchaser sees fit.

Step S166, which includes applying a budgeting rule that transfers money based in part on the purchase, functions to initiate account action outside of the purchase. Step S166 is preferably used for money management rules of a purchaser account. The transfer of money may additionally be scheduled from some future date. As one example, S166 may be used to automatically give a donation to a particular charity. As another example, S166 may be used to automatically manage a budget for a purchaser such as by moving funds into a savings account for every purchase. The budgeting rule preferably uses small transaction amounts (e.g., fractions of a dollar) that are based on a percentage of the purchase price total, but may be fixed amounts or any suitable value. The budgeting rule in one preferred variation functions similar to a rewards program as is known in the art. The budgeting rule can use any suitable information about a purchase such as merchant name, merchant type (SKU code), individual item description, individual item price, or any suitable information collected about a purchase for determining where to transfer money and how to determine the amount to transfer. Additionally, a purchaser may select a desired budgeting rule (or reward) to enact for a purchase. For example, a purchaser may have several budgeting rules. A first budgeting rule may contribute a percentage of a purchase price total to a charity for all purchases made at grocery stores. A second budgeting rule may move a fixed amount into a savings account for every item that is determined to be a consumer electronics-related product. Of course, a third budgeting rule can act like a tax to dissuade certain purchases, such as alcohol or tobacco. Additionally, as part of the budgeting rule, an amount of money may have restricted use. The restricted use preferably prevents the money from being used for purchases other than those set by the rule. For example, money may be restricted for a particular vendor so as to function in a manner similar to a gift card for that particular vendor. The money may be restricted for food items, entertainment, bills, or any suitable category of purchases. This category restriction could function as a personal budgeting tool. For example, a user could set up a budgeting rule that for every dollar spent on consumer electronics two will be reserved for food items.

Figure 7:
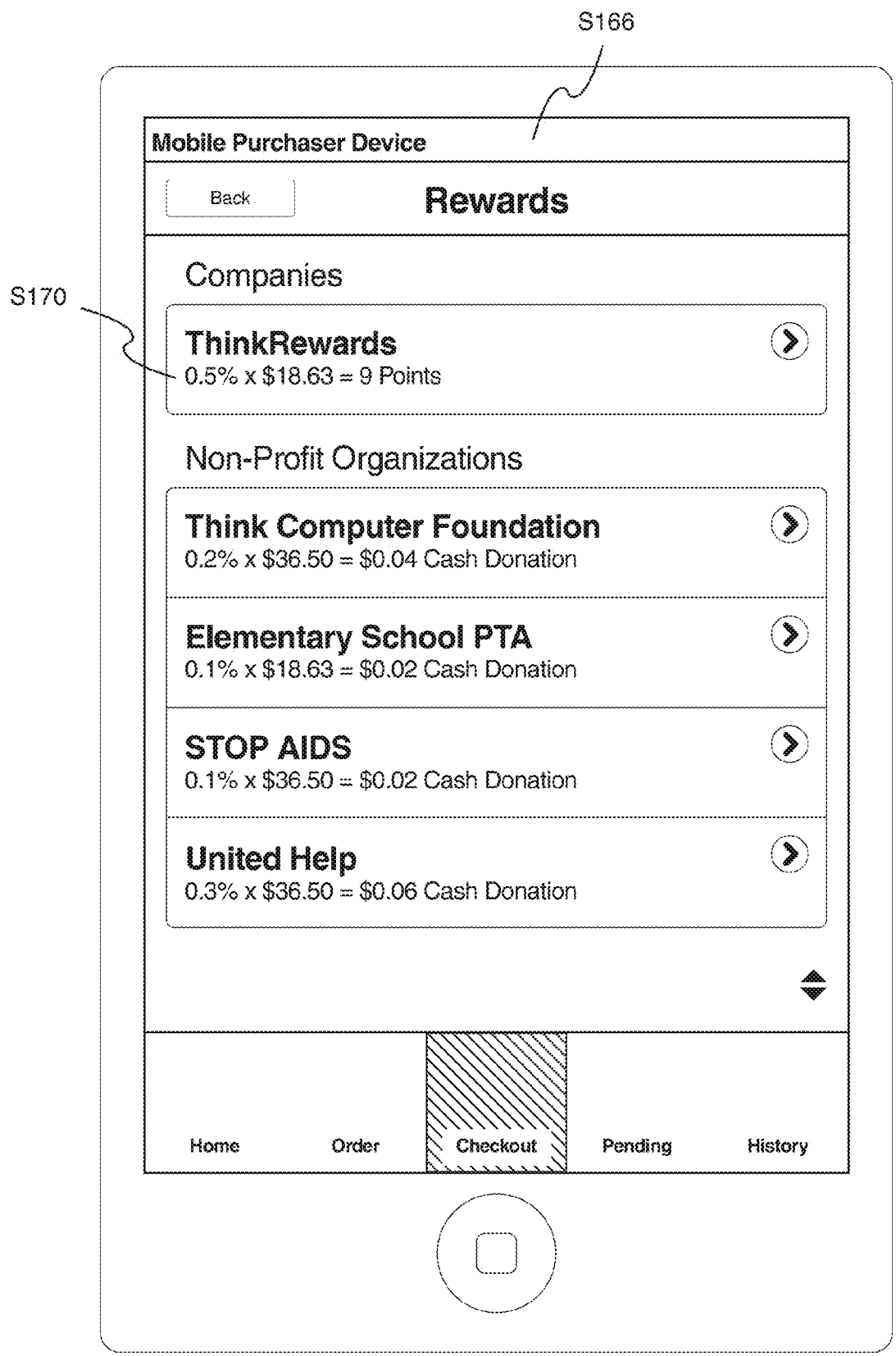
FIG. 7 is an exemplary screenshot of an electronic terminal displaying budgeting rule options.

Additionally or alternatively, the method of the preferred embodiment includes communicating a notification of purchase related effects S170, which functions to provide information about a purchase to the merchant and/or purchaser at the time of sale. For a purchaser, the notification is preferably related to the purchaser account. As a first example many financial accounts offer rewards for purchases such as cash back rewards, points, mileage points, or any suitable reward system. Step S170 would function to notify the purchaser of the number of rewards collected by each purchase. Additionally or alternatively, a notification may be sent containing the account balance before and/or after a purchase. Used in combination with Step S166, notifications are provided to the purchaser containing information related to the amount of money transferred to other accounts (e.g., charities, savings accounts etc.) as part of a budgeting rule, as shown in FIG. 7. Additionally, as one of the main benefits of having merchant product catalogs integrated into the payment system, line item transaction data can be communicated. The line item data is additionally stored as part of the transaction record of the accounts. This itemized information can be very useful, such as in one application where tax forms are automatically completed by aggregating each category of line item transaction data as appropriate. For a merchant, information such as the inventory levels of a product could be displayed along with any data related to the impact of a particular purchase.

Figure 8:
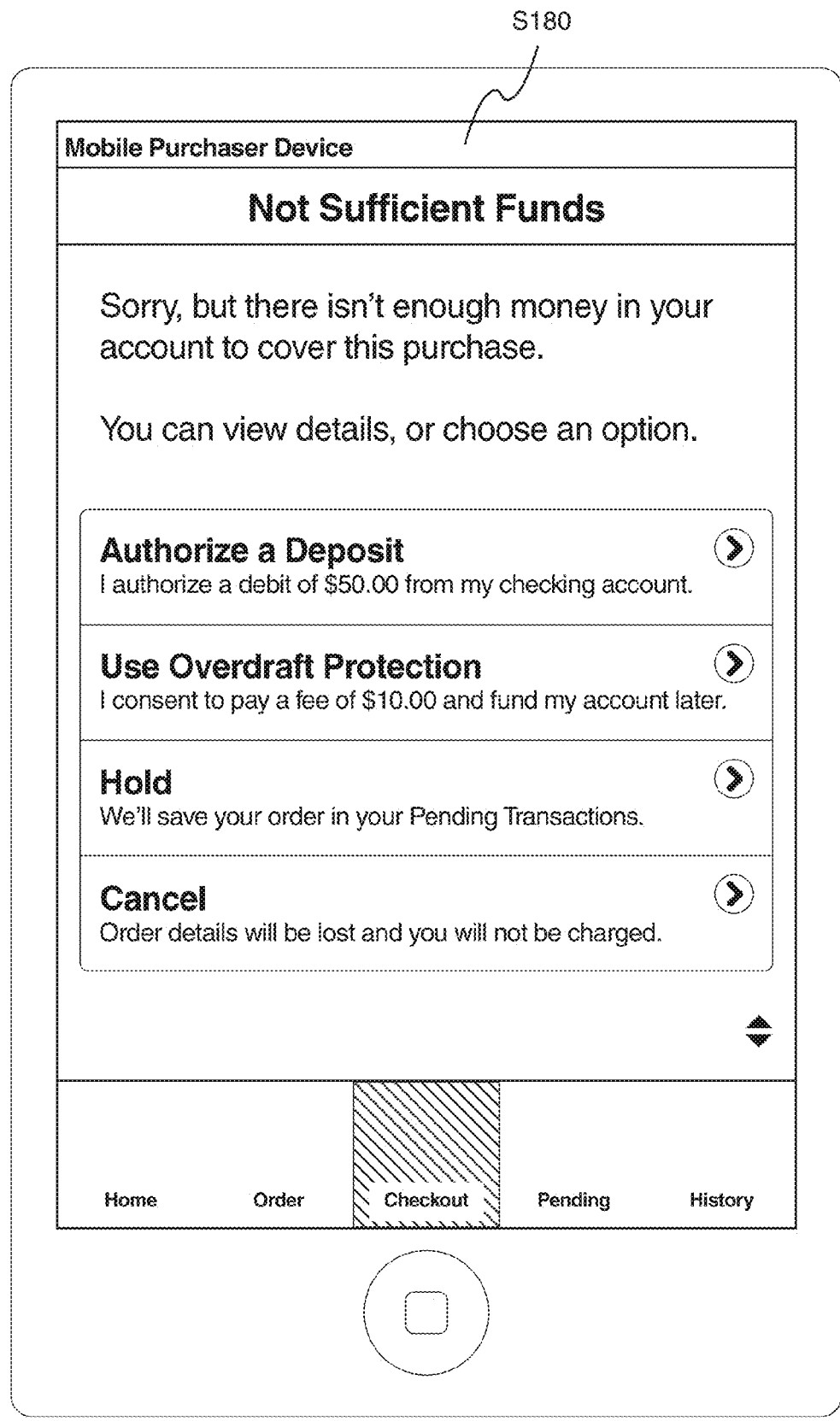
FIG. 8 is an exemplary screenshot of an electronic terminal receiving purchaser approval for account-related warnings.

Additionally, the method of the preferred embodiment may include receiving purchaser acknowledgment of an account-related warning S180. An account warning preferably includes an error or alert that the account does not have sufficient funds for a purchase. An insufficient funds warning is preferably identified in Step S150 when the payment system is performing the steps of transferring funds. The account-related warning is preferably received at the time of purchase, and the acknowledgment includes obtaining purchaser consent to ameliorative actions at the time of purchase. The payment system will preferably provide various payment plan options that could be used in a situation where the purchaser account does not have sufficient funds, as shown in FIG. 8. For example, the payment system may loan the purchaser money for the purchase or provide an option to deposit funds into the purchaser account from a second financial account. The account warning may additionally be related to an account balance dipping below a threshold and displaying a message informing the purchaser. The account warning may be activated due to suspicious spending on the account. In this variation, additional security questions can be displayed such that the correct answering of questions allows a purchase to be approved, while incorrect answering places a hold on the account. The security questions may be sent to the merchant or displayed on a device of the purchaser.

2. System for Transferring an Electronic Payment

Figure 9:
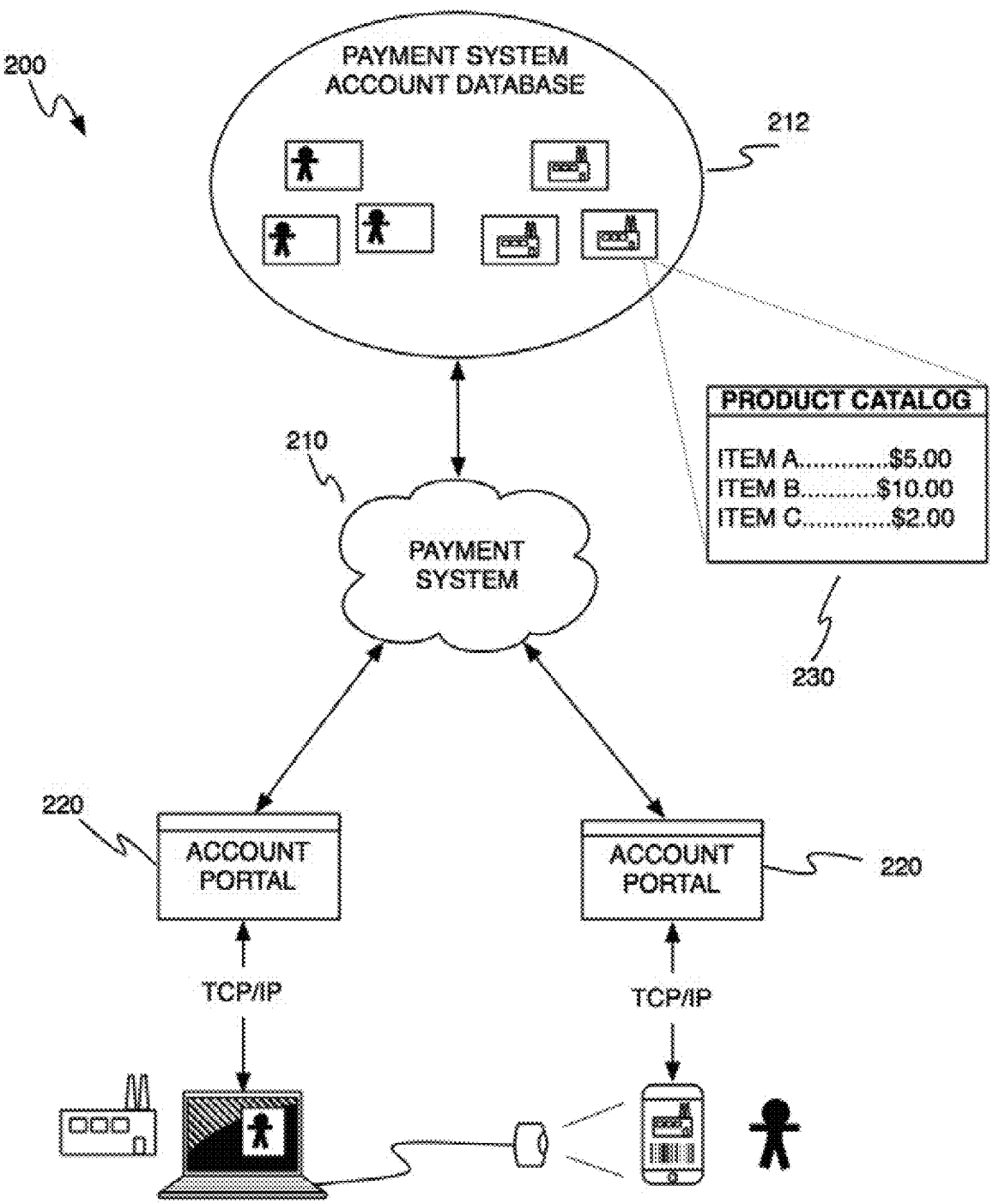
FIG. 9 is a schematic representation of a system for transferring an electronic payment of a preferred embodiment of the invention.

As shown in FIG. 9, the system 200 for transferring an electronic payment of the preferred embodiment includes a payment system 210, an account portal 220, and a product catalog 230. The system 200 functions to provide the infrastructure for implementing the method described above.

The payment system 210 of the preferred embodiment functions to coordinate purchases that occur between a merchant and a purchaser. The payment system 210 preferably includes a plurality of payment system accounts stored in a connected account database 212. The payment system accounts preferably can act as merchant accounts or purchaser accounts as described above. The payment system accounts are preferably used to identify a user of the payment system, for holding funds or alternatively linking to a financial account, and storing any suitable payment system account-related information. The payment system 210 is preferably a server or a plurality of servers that can connect a merchant or purchaser through a TCP/IP internet connection. However, any suitable protocol may alternatively be used such as IPv6.

The account portal 220 of the preferred embodiment functions as the interface between an electronic terminal (e.g., merchant terminal or a purchaser terminal) and the payment system. The account portal 220 preferably allows a user to manage an account and complete a purchase transaction as described in the method above through either a merchant interface or a purchaser interface. In this way, any account may be used in a transaction as either a merchant account or a purchaser account. The account portal 220 preferably includes transaction interface tools and a product catalog management tool. The account portal 220 is preferably a website, but may additionally or alternatively be an application communicating to the payment system through an application programming interface. The account portal 220 is preferably used on a hardware device and connects to the payment system 210 through a TCP/IP network connection. Additionally the account portal 220 functions to allow for control of a product catalog 230 of a merchant. The account portal 220 preferably allows for a user ID token to be retrieved from the account database 212 and displayed on an electronic terminal (e.g., a purchaser terminal) preferably in an encoded form (e.g. a barcode). A merchant terminal can then preferably collect the user ID token from a purchaser terminal displaying or transmitting the encoded the user ID token and pass the user ID token through the account portal to the payment system 210 to create a transaction session. The account portal 220 is preferably accessible by a variety of devices including personal computers and mobile devices.

The product catalog 230 of the preferred embodiment functions as an accessible database of for-sale offerings of a merchant. The product catalog is preferably stored within the payment system 210 and is preferably stored in a manner allowing each product to be linked to one or more merchant accounts. The product catalog 230 is preferably a database of relevant product information such as descriptions and prices. The items of the product catalog 230 are preferably pre-categorized (i.e., categorized prior to any transaction taking place) by type of product. The merchant preferably assigns the categorization of a product, but categorization may be assigned in any suitable manner. For example, a hamburger at a restaurant will be pre-categorized as food by the restaurant. Pre-categorization serves to simplify accounting for both the merchant and the purchaser. The payment system will preferably know which types of items were purchased or sold for an account. In one application, a tax form is automatically filled out by aggregating transaction information for the food category so that a 50% meals deduction offered by the IRS can be applied to those expenditures. The product catalog may additionally be accessed as an online store with products able to be added to a purchase list (shopping cart). The product catalog 220 is preferably accessible on a merchant terminal for management of the product catalog and for adding items to a purchase list for a purchaser. Additionally a product catalog may be accessed on a purchaser terminal for adding items to a purchase list.

As a person skilled in the art will recognize from the previous detailed description and from the figures and claims, modifications and changes can be made to the preferred embodiments of the invention without departing from the scope of this invention defined in the following claims.

I claim:

1. A method for transferring an electronic payment between a purchaser and a merchant comprising:
    assigning a role of a merchant account to a first account and a role of a purchaser account to a second account within a payment system wherein the first account and the second account are adapted to selectively function as either a merchant account or a purchaser account during any particular transaction;
    adding an item offered for sale by the merchant from a product catalog stored in the payment system to a purchase list;
    obtaining a user ID token of the purchaser from a merchant terminal, the merchant terminal being at a merchant location and the merchant location being different from the payment system;
    communicating identity confirmation information associated with the user ID token to the merchant terminal; and
    transferring funds for a purchase price total from the purchaser account to the merchant account.

2. The method of claim 1, further comprising storing purchase list information as a transaction record for the merchant account and the purchaser account.

3. The method of claim 2, further comprising serving the product catalog to a purchaser terminal, wherein an item is added to the product catalog from the purchaser terminal.

4. The method of claim 3, further comprising navigating the purchaser terminal to the product catalog of a merchant based on the location of the purchaser terminal.

5. The method of claim 2, further comprising serving the product catalog to the merchant terminal, wherein an item is added to the product catalog from the merchant terminal.

6. The method of claim 2, wherein the step of obtaining a user ID token of a purchaser includes scanning a barcode provided by the purchaser.

7. The method of claim 6, further comprising providing a barcode displayable on a purchaser terminal.

8. The method of claim 2, wherein the step of communicating identity confirmation information includes sending an image associated with an account ID, wherein the image comprises a photograph of an owner of the purchaser account, and receiving confirmation from the merchant terminal that the image associated with the account ID matches that of the purchaser.

9. The method of claim 2, further comprising augmenting a transaction associated with the transfer of funds.

10. The method of claim 9, wherein augmenting the transaction includes adding a purchaser-variable value to the purchase price total.

11. The method of claim 10, wherein adding a purchaser-variable value to the purchase price total includes allowing the purchaser to set the purchaser-variable value after the purchase with the merchant is completed.

12. The method of claim 11, wherein adding a purchaser-variable value to a purchase price includes setting a default value greater than zero, and using the default value as the purchaser-variable value if the purchaser-variable value is not set by an expiration time.

13. The method of claim 9, wherein augmenting the transaction includes charging a portion of the purchase price total to at least a third account.

14. The method of claim 13, wherein a percentage of the purchase price total is charged to the purchaser account and a remaining percentage of the purchase price total is charged to the third account.

15. The method of claim 13, wherein the portion of the purchase price total charged to at least a third account is calculated from items from the product list that are selected to be charged to the third account.

16. The method of claim 9, wherein augmenting the transaction includes applying a budgeting rule that transfers money based in part on the purchase.

17. The method of claim 2, further comprising communicating a notification of purchase-related effects at the time of purchase.

18. The method of claim 2, further comprising receiving purchaser acknowledgment of account-related warnings at the time of purchase and obtaining purchaser consent to ameliorative actions at the time of purchase.

19. A method for transferring an electronic payment between a purchaser and a merchant comprising:
assigning a role of a merchant account to a first account and a role of a purchaser account to a second account within a payment system wherein the first account and the second account are adapted to selectively function as either a merchant account or a purchaser account during any particular transaction;
adding at least one item offered for sale by the merchant from a product catalog stored in the payment system to a purchase list;
providing a user ID token in the form of a barcode that is displayable on a purchaser terminal;
obtaining a user ID token of the purchaser from a merchant terminal by scanning a purchaser terminal display of the barcode user ID, the merchant terminal being at a merchant location and the merchant location being different from the payment system;
communicating identity confirmation information associated with the user ID token to the merchant terminal, wherein the identity confirmation information is an image of an owner of the purchaser account;
receiving confirmation from the merchant terminal that the image matches the owner of the purchaser account;
transferring funds for a purchase price total from the purchaser account to the merchant account; and
recording purchase list information as a transaction record for the merchant account and the purchaser account.

20. A system for transferring an electronic payment between a purchaser and a merchant comprising:
a payment system that manages transactions between the purchaser and the merchant and includes a payment system account database, wherein the account database includes a plurality of accounts that are adapted to selectively function as either a merchant account or a purchaser account during any particular transaction and wherein the merchant is at a merchant location and the merchant location is different from the payment system;
a product catalog with categorized items offered for sale by the merchant that is hosted within the payment system;
an account portal that connects an electronic terminal to the payment system through a network connection, and includes transaction interface tools and product catalog management tool; and
wherein the account portal connects the purchaser to the payment system with a transaction interface for a purchaser and connects a merchant to the payment system with a merchant interface.

21. A method performed over a payment network for transferring an electronic payment between a purchaser and a merchant, the payment network comprising a plurality of merchant terminals connected to a plurality of payment servers, an accounts database that includes a plurality of accounts adapted to selectively function as either a merchant account or a purchaser account during any particular transaction, and a product catalog database of items offered for sale by the merchant, wherein each merchant terminal has an ID token reader, a display, and network capabilities, the method comprising the steps of:
assigning the role of a merchant account to a first account from the accounts database and the role of a purchaser account to a second account from the accounts database;
creating a purchase list with at least one item from the product catalog database;
reading, with the ID token reader of a merchant terminal, the user ID token of a purchaser and sending the user ID token to a payment server, the merchant terminal being at a merchant location and the merchant location being different from the product catalog database;
transmitting, from the payment server to the merchant terminal, identity confirmation information associated with the user ID token;
transmitting, from the merchant terminal to the payment server, a payment approval communication;
transferring, with the payment server, payment from the purchaser account to the merchant account.

22. A method performed over a payment network for transferring an electronic payment between a purchaser and a merchant, the payment network comprising a plurality of merchant terminals and purchaser terminals connected to a plurality of payment servers, an accounts database that includes a plurality of accounts adapted to selectively function as either a merchant account or a purchaser account during any particular transaction, and a product catalog database of items offered for sale by the merchant, wherein each merchant terminal has an ID token reader, a display, and network capabilities, the method comprising the steps of:
assigning the role of a merchant account to a first account from the accounts database and the role of a purchaser account to a second account from the accounts database;
creating a purchase list with at least one item from the product catalog database;
transmitting, from a purchaser terminal to a merchant terminal, the user ID token of a purchaser and sending the user ID token to a payment server, the merchant terminal being at a merchant location and the merchant location being different from the product catalog database;
transmitting, from the payment server to the merchant terminal, identity confirmation information associated with the user ID token;
transmitting, from the merchant terminal to the payment server, a payment approval communication;
transferring, with the payment server, payment from the purchaser account to the merchant account.

* * * * *